US012501333B2

(12) United States Patent
Jeong

(10) Patent No.: US 12,501,333 B2
(45) Date of Patent: Dec. 16, 2025

(54) MEASUREMENT AND CELL RESELECTION IN A NTN

(71) Applicant: Samsung Electronics Co., Ltd., Suwon-si (KR)

(72) Inventor: Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 562 days.

(21) Appl. No.: 17/936,818

(22) Filed: Sep. 29, 2022

(65) Prior Publication Data

US 2023/0129437 A1 Apr. 27, 2023

Related U.S. Application Data

(60) Provisional application No. 63/270,412, filed on Oct. 21, 2021.

(51) Int. Cl.
*H04W 4/00* (2018.01)
*H04W 36/08* (2009.01)
*H04W 36/32* (2009.01)
*H04W 84/06* (2009.01)

(52) U.S. Cl.
CPC ......... *H04W 36/08* (2013.01); *H04W 36/322* (2023.05); *H04W 36/326* (2023.05); *H04W 84/06* (2013.01)

(58) Field of Classification Search
CPC . H04W 36/08; H04W 36/322; H04W 36/326; H04W 84/06; H04W 48/20; H04W 24/10; H04W 36/0085; H04W 36/30; H04W 48/10; Y02D 30/70

USPC ......................................................... 370/331
See application file for complete search history.

(56) References Cited

U.S. PATENT DOCUMENTS

| | | | |
|---|---|---|---|
| 10,764,815 B2* | 9/2020 | Park | H04W 48/08 |
| 11,071,086 B2* | 7/2021 | Park | H04W 76/28 |
| 11,224,013 B2* | 1/2022 | Stawiarski | H04W 48/12 |
| 11,228,984 B2* | 1/2022 | Harrison | H04B 7/0465 |
| 11,812,369 B2* | 11/2023 | Park | H04W 74/0833 |
| 11,818,072 B2* | 11/2023 | Cirik | H04L 5/001 |
| 11,902,002 B2* | 2/2024 | Ma | H04W 24/10 |
| 11,963,125 B2* | 4/2024 | Jeong | G01S 19/53 |

(Continued)

OTHER PUBLICATIONS

International Search Report and Written Opinion issued Feb. 2, 2023 regarding International Application No. PCT/KR2022/015967, 8 pages.

(Continued)

*Primary Examiner* — Amancio Gonzalez

(57) ABSTRACT

Methods and apparatuses for measurement and cell reselection in NTN. A method of operating a UE comprises: determining, based on a first threshold and a second threshold, whether a first condition is satisfied; determining, based on a third threshold, whether a second condition is satisfied; and skipping measurement operations on neighboring cells in a NTN based on a determination that the first condition and the second condition are satisfied, wherein: the first condition corresponds to a cell selection receive (RX) level value (Srxlev) being greater than the first threshold and a cell selection quality value (Squal) being greater than the second threshold, respectively, and the second condition corresponds to a distance between a UE location and a serving cell reference point being less than the third threshold.

20 Claims, 11 Drawing Sheets

(56) References Cited

U.S. PATENT DOCUMENTS

| | | | | |
|---|---|---|---|---|
| 11,985,618 | B2* | 5/2024 | Narasimha | H04B 7/18506 |
| 11,997,710 | B2* | 5/2024 | Gao | H04W 48/12 |
| 12,009,901 | B2* | 6/2024 | Wei | H04B 7/1851 |
| 12,082,201 | B2* | 9/2024 | Yi | H04W 72/23 |
| 12,096,289 | B2* | 9/2024 | Xu | H04W 36/08 |
| 12,120,573 | B2* | 10/2024 | Niu | H04W 36/32 |
| 12,133,121 | B2* | 10/2024 | Lee | H04W 52/0229 |
| 12,149,957 | B2* | 11/2024 | Wei | H04W 16/28 |
| 12,192,837 | B2* | 1/2025 | Sedin | H04W 36/0085 |
| 12,213,012 | B2* | 1/2025 | Wang | H04W 36/326 |
| 12,213,096 | B2* | 1/2025 | Yiu | H04W 48/12 |
| 12,225,456 | B2* | 2/2025 | Lee | H04W 48/20 |
| 12,238,783 | B2* | 2/2025 | Narasimha | H04W 72/0446 |
| 2021/0076275 | A1 | 3/2021 | Yiu et al. | |
| 2021/0227442 | A1* | 7/2021 | Yiu | H04W 36/00837 |
| 2021/0314835 | A1 | 10/2021 | Lee et al. | |
| 2021/0377828 | A1* | 12/2021 | Tao | H04W 74/0833 |
| 2022/0046517 | A1* | 2/2022 | Dang | H04W 48/04 |
| 2022/0078746 | A1* | 3/2022 | Lee | H04W 64/003 |
| 2022/0116844 | A1* | 4/2022 | Qiao | H04W 48/20 |
| 2022/0174566 | A1* | 6/2022 | Shreevastav | H04W 48/16 |
| 2022/0200741 | A1* | 6/2022 | You | H04L 1/1812 |
| 2022/0346157 | A1* | 10/2022 | Wang | H04W 72/1268 |
| 2022/0386202 | A1* | 12/2022 | You | H04W 84/06 |
| 2022/0394579 | A1* | 12/2022 | Fujishiro | H04W 48/20 |
| 2023/0037553 | A1* | 2/2023 | Shih | H04W 36/13 |
| 2023/0089127 | A1* | 3/2023 | Dong | H04W 36/326 455/440 |
| 2023/0102334 | A1* | 3/2023 | Roy | H04W 36/06 370/316 |
| 2023/0308168 | A1* | 9/2023 | Määttänen | H04B 7/18519 |
| 2023/0308980 | A1* | 9/2023 | Rune | H04B 7/18541 |
| 2023/0319661 | A1* | 10/2023 | Määttänen | H04W 36/0085 370/331 |
| 2024/0056919 | A1* | 2/2024 | Li | H04B 7/18541 |
| 2024/0063894 | A1* | 2/2024 | Vogedes | H04B 7/18541 |
| 2024/0063986 | A1* | 2/2024 | Hwang | H04L 5/0094 |
| 2024/0064629 | A1* | 2/2024 | Yu | H04W 48/20 |
| 2024/0080758 | A1* | 3/2024 | Yavuz | H04W 48/12 |
| 2024/0080785 | A1* | 3/2024 | Shi | H04W 76/27 |
| 2024/0088993 | A1* | 3/2024 | Yu | H04B 7/18513 |
| 2024/0098586 | A1* | 3/2024 | Da Silva | H04W 36/24 |
| 2024/0114372 | A1* | 4/2024 | Xu | H04W 36/0085 |
| 2024/0172255 | A1* | 5/2024 | Luo | H04W 8/005 |
| 2024/0187955 | A1* | 6/2024 | Wu | H04W 36/362 |
| 2024/0196294 | A1* | 6/2024 | Li | H04W 36/0088 |
| 2024/0244500 | A1* | 7/2024 | Hu | H04W 36/362 |
| 2024/0259088 | A1* | 8/2024 | Rune | H04B 7/18532 |
| 2024/0259934 | A1* | 8/2024 | Choe | H04W 36/24 |
| 2024/0340673 | A1* | 10/2024 | Kim | H04W 48/16 |
| 2024/0357449 | A1* | 10/2024 | Li | H04W 36/0058 |
| 2024/0373269 | A1* | 11/2024 | Wänstedt | H04W 48/16 |
| 2024/0389014 | A1* | 11/2024 | Li | H04W 48/20 |
| 2024/0406830 | A1* | 12/2024 | Yan | H04W 24/02 |

OTHER PUBLICATIONS

CATT, "Further Discussion on the Leftover Issues of Idle/Inactive", R2-2107317, 3GPP TSG-RAN WG2 Meeting #115-e, Aug. 2021, 4 pages.
Convida Wireless, "NTN Cell (re)selection enhancements", R2-2108413, 3GPP TSG-RAN WG2 Meeting #115-e, Aug. 2021, 7 pages.
Huawei et al., "Discussion on cell reselection", R2-2107344, 3GPP TSG-RAN WG2 Meeting #115-e, Aug. 2021, 5 pages.
"3rd Generation Partnership Project; Technical Specification Group Radio Access Network; NR; User Equipment (UE) procedures in Idle mode and RRC Inactive state (Release 16)", 3GPP TS 38.304 V16.6.0, Sep. 2021, 39 pages.
"3rd Generation Partnership Project; Technical Specification Group Radio Access Network; NR; Physical channels and modulation (Release 16)", 3GPP TS 38.211 v16.4.0, Dec. 2020, 133 pgs.
"3rd Generation Partnership Project; Technical Specification Group Radio Access Network; NR; Multiplexing and channel coding (Release 16)", 3GPP TS 38.212 v16.4.0, Dec. 2020, 152 pgs.
"3rd Generation Partnership Project; Technical Specification Group Radio Access Network; NR; Physical layer procedures for control (Release 16)", 3GPP TS 38.213 v16.4.0, Dec. 2020, 181 pgs.
"3rd Generation Partnership Project; Technical Specification Group Radio Access Network; NR; Physical layer procedures for data (Release 16)", 3GPP TS 38.214 v16.4.0, Dec. 2020, 169 pgs.
"3rd Generation Partnership Project; Technical Specification Group Radio Access Network; NR; Medium Access Control (MAC) protocol specification (Release 16)", 3GPP TS 38.321 v16.3.0, Dec. 2020, 156 pgs.
"3rd Generation Partnership Project; Technical Specification Group Radio Access Network; NR; Radio Resource Control (RRC) protocol specification (Release 16)", 3GPP TS 38.331 v16.3.1, Jan. 2021, 932 pgs.

* cited by examiner

MEASUREMENT AND CELL RESELECTION IN A NTN

CROSS-REFERENCE TO RELATED APPLICATIONS AND CLAIM OF PRIORITY

The present application claims priority to U.S. Provisional Patent Application No. 63/270,412, filed on Oct. 21, 2021. The content of the above-identified patent document is incorporated herein by reference.

TECHNICAL FIELD

The present disclosure relates generally to wireless communication systems and, more specifically, the present disclosure relates to a measurement and cell reselection in a non-terrestrial network (NTN).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a measurement and cell reselection in an NTN.

In one embodiment, a user equipment (UE) in a wireless communication system is provided. The UE comprises a transceiver and a processor operably coupled to the transceiver. The processor of UE configured to: determine, based on a first threshold and a second threshold, whether a first condition is satisfied, determine, based on a third threshold, whether a second condition is satisfied, and skip measurement operations on neighboring cells in an NTN based on a determination that the first condition and the second condition are satisfied, wherein: the first condition corresponds to a cell selection receive (RX) level value (Srxlev) being greater than the first threshold and a cell selection quality value (Squal) being greater than the second threshold, respectively, and the second condition corresponds to a distance between a UE location and a serving cell reference point being less than the third threshold.

In another embodiment, a method of UE in a wireless communication system is provided. The method comprises: determining, based on a first threshold and a second threshold, whether a first condition is satisfied; determining, based on a third threshold, whether a second condition is satisfied; and skipping measurement operations on neighboring cells in a NTN based on a determination that the first condition and the second condition are satisfied, wherein: the first condition corresponds to a Srxlev being greater than the first threshold and a Squal being greater than the second threshold, respectively, and the second condition corresponds to a distance between a UE location and a serving cell reference point being less than the third threshold.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein:

3GPP TS 38.304 v16.6.0, "NR; User Equipment (UE) procedures in idle mode and in RRC Inactive state"; 3GPP TS 38.211 v16.4.0, "NR; Physical channels and modulation"; 3GPP TS 38.212 v16.4.0, "NR; Multiplexing and Channel coding"; 3GPP TS 38.213 v16.4.0, "NR; Physical Layer Procedures for Control"; 3GPP TS 38.214 v16.4.0, "NR; Physical Layer Procedures for Data"; 3GPP TS 38.321 v16.3.0, "NR; Medium Access Control (MAC) protocol specification"; and 3GPP TS 38.331 v16.3.1, "NR; Radio Resource Control (RRC) Protocol Specification."

Figure 1:
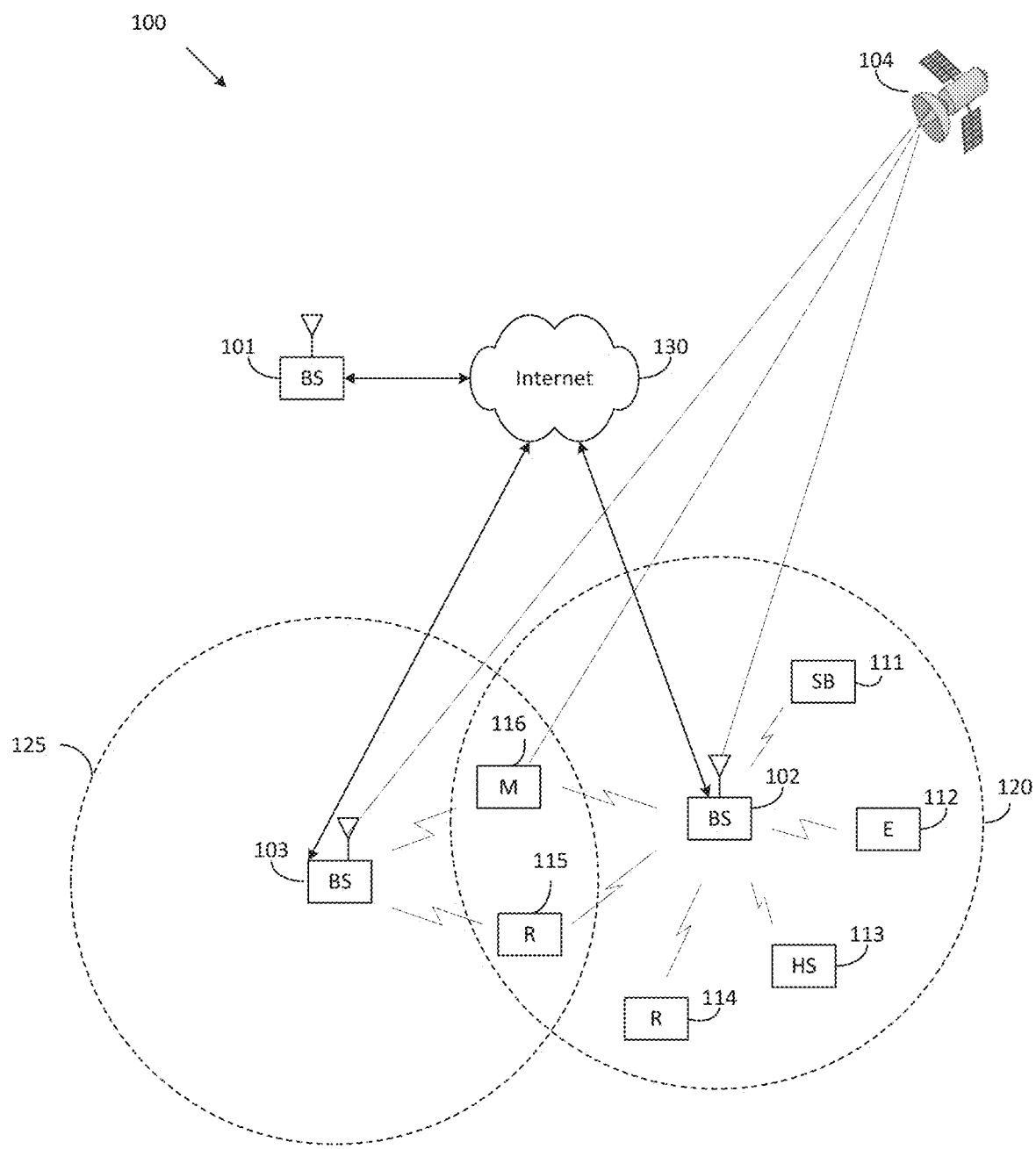
FIG. 1 illustrates an example of wireless network according to embodiments of the present disclosure.
Figure 2:
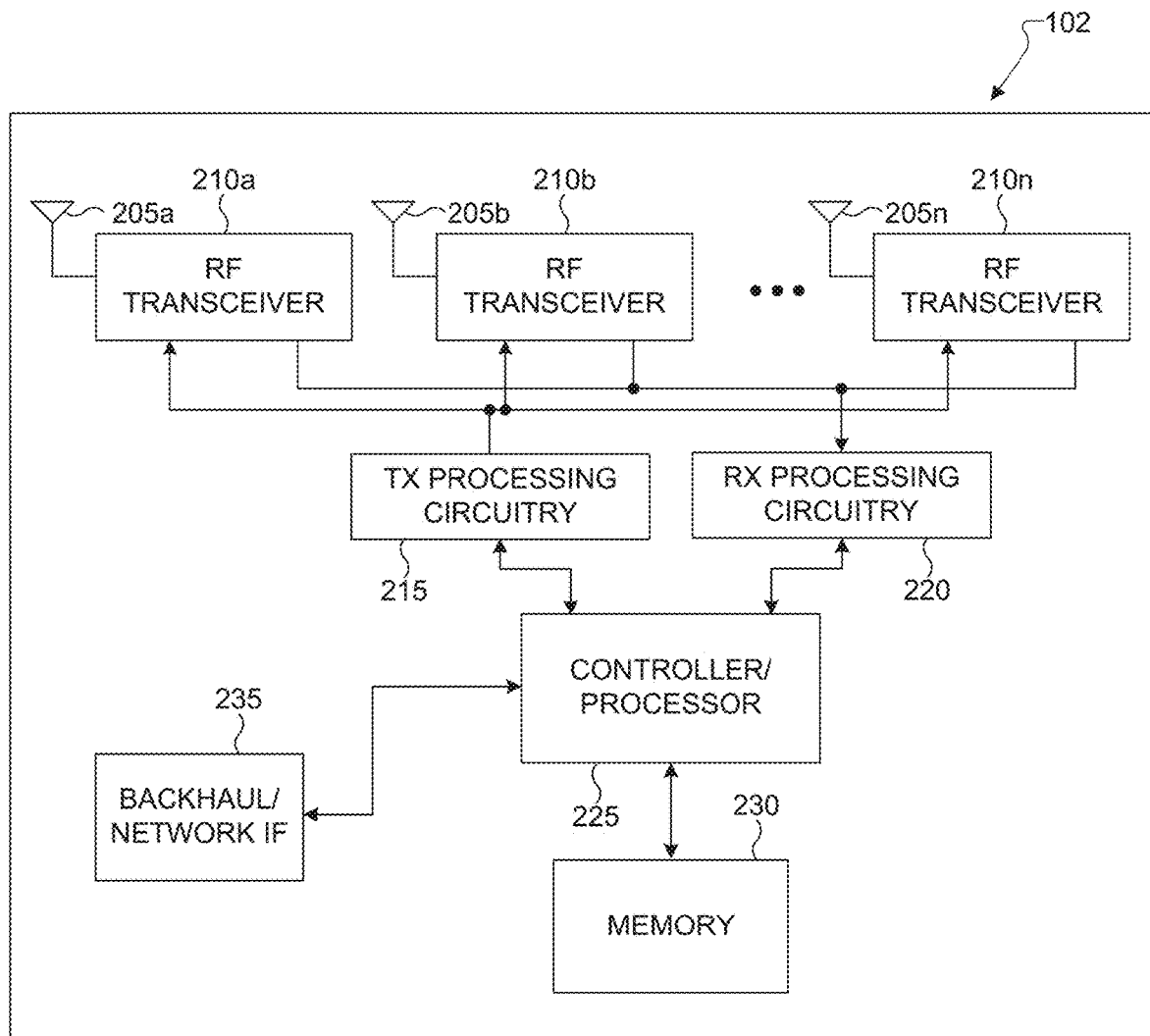
FIG. 2 illustrates an example of gNB according to embodiments of the present disclosure.
Figure 3:
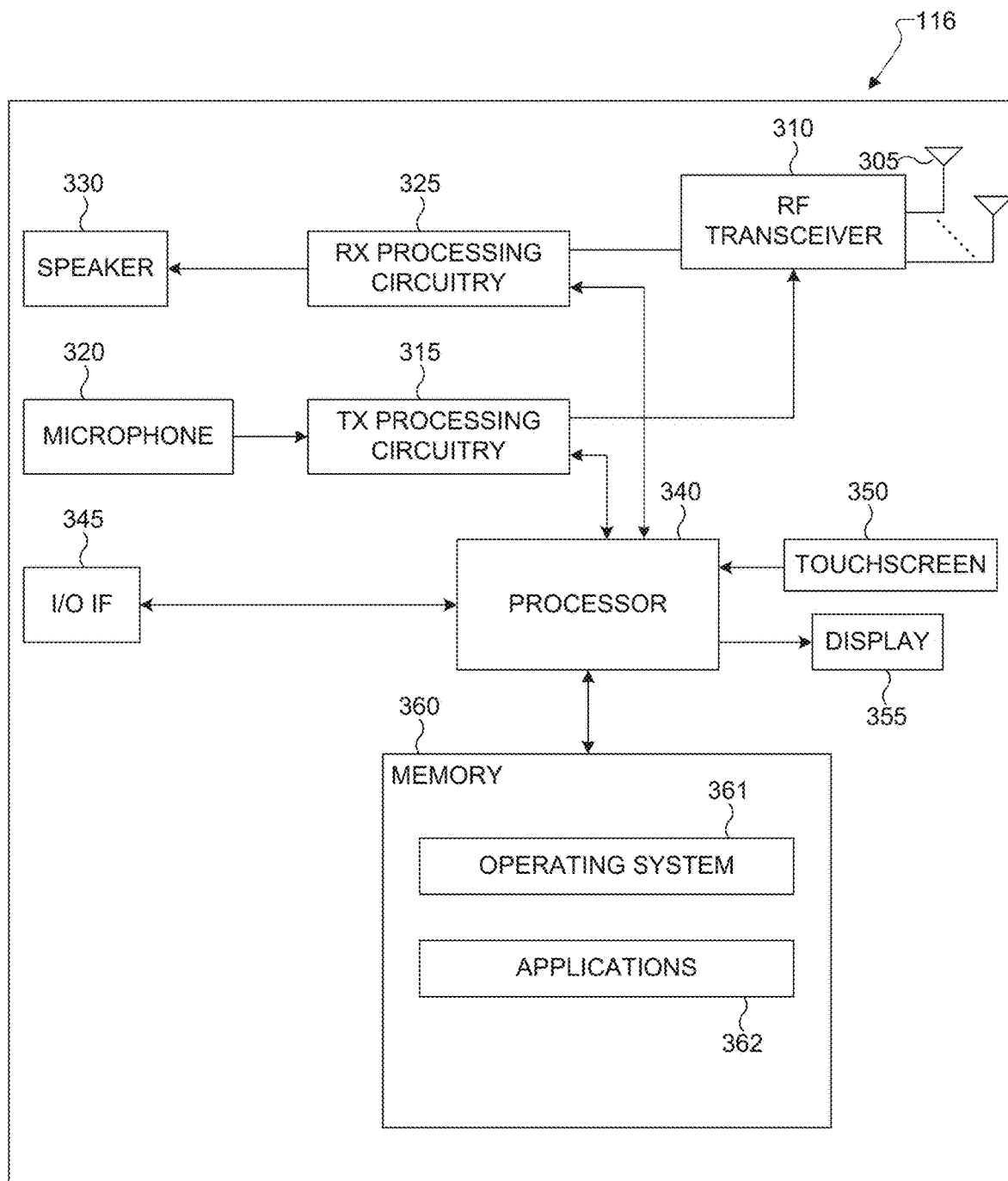
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As discussed in greater detail below, the wireless network 100 may have communications facilitated via one or more communication satellite(s) 104 that may be in obit over the earth. The communication satellite(s) 104 can communicate directly with the BSs 102 and 103 to provide network access, for example, in situations where the BSs 102 and 103 are remotely located or otherwise in need of facilitation for network access connections beyond or in addition to traditional fronthaul and/or backhaul connections. Various of the UEs (e.g., as depicted by UE 116) may be capable of at least some direct communication and/or localization with the communication satellite(s) 104, for example, to receive positional information or coordinates.

An NTN refers to a network, or segment of networks using RF resources on board a communication satellite (or unmanned aircraft system platform) (e.g., communication satellite(s) 104). Considering the capabilities of providing wide coverage and reliable service, an NTN is envisioned to ensure service availability and continuity ubiquitously. For instance, an NTN can support communication services in unserved areas that cannot be covered by conventional terrestrial networks, in underserved areas that are experiencing limited communication services, for devices and passengers on board moving platforms, and for future railway/maritime/aeronautical communications, etc.

As described in more detail below, one or more of the UEs 111-116 include circuitry, programming, or a combination thereof, for a measurement and cell reselection in an NTN. In certain embodiments, and one or more of the gNBs 101-103 includes circuitry, programming, or a combination thereof, for a measurement and cell reselection in an NTN.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support a measurement and cell reselection in an NTN. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a measurement and cell reselection in an NTN. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
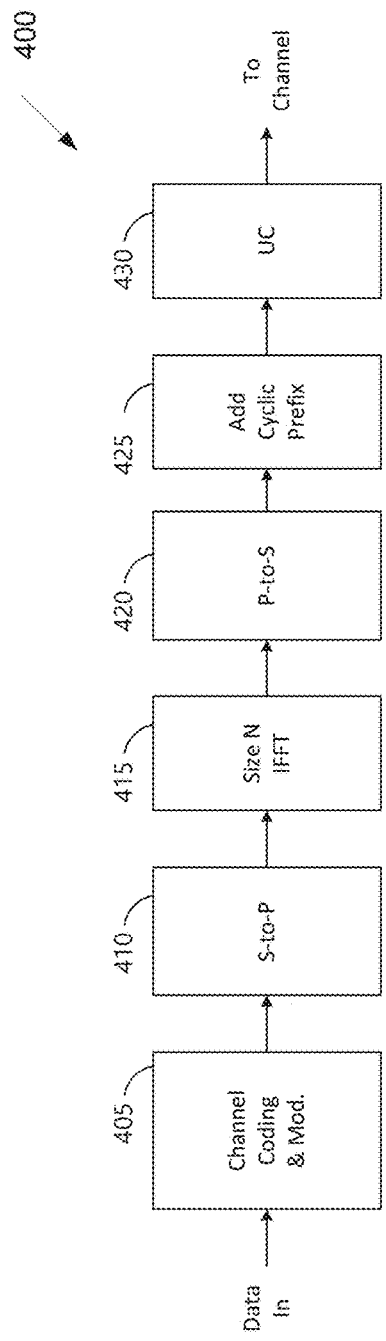
FIGS. 4 and 5 illustrate example of wireless transmit and receive paths according to this disclosure.
Figure 5:
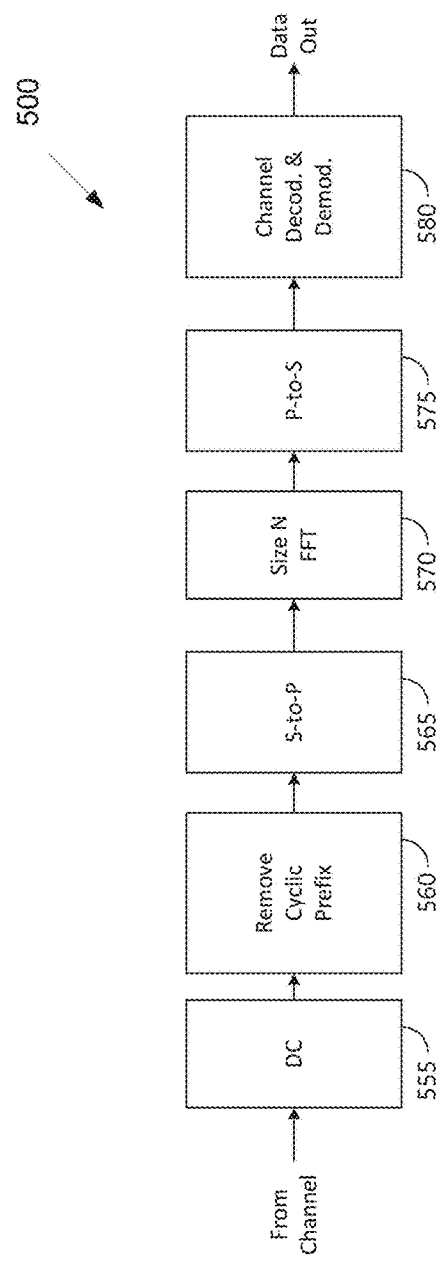

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

There are several use cases for using the UE position in an NTN such as identifying the UE location in a cell, estimating the UE-platform/UE-NTN-GW/UE-gNB distance, estimating timing advance, determining a synchronization signal/physical broadcast channel (SS/PBCH) block measurement timing configuration (SMTC) configuration, determining associated virtual cell(s), determining earth-fixed tracking area, enhancing the scheduling, facilitating cell selection/reselection, and facilitating handover.

However, if the UE needs to continuously determine its GNSS-based position, the UE may drain the UE battery life. At the other extreme, if there is a long gap between the instants when the UE determines its GNSS-based position, the long gap would affect the accuracy of the UE position that is known to the network, adversely affecting various operations mentioned above. Furthermore, if the UE position is reported too frequently, it would significantly increase the amount of signaling and required increased processing at the UE and in the network. Additionally, depending upon the use case, an RRC signaling may be too slow and a lower layer reporting may be more effective.

As of Release 16 of 3GPP, there are no mechanisms in place for the UE to frequently report the UE's position to the network except in support of self-organizing network/minimization of driving test (SON/MDT). This disclosure introduces enhancements in the areas such as: (i) when the UE determines its UE position, (ii) the conditions under which the UE reports its positon, (iii) formats of reporting of the UE position, and (iv) signaling used by the UE to report its position.

In an NR TN, the following measurement rules as shown in TABLE 1 are specified in 3GPP standard specification TS 38.304. The measurement rule is used to enable skipping the neighbouring cells measurements for better UE power saving gains.

TABLE 1

| Measurement rules |
|---|
| 5.2.4.2 Measurement rules for cell re-selection<br>Following rules are used by the UE to limit needed measurements:<br>    If the serving cell fulfils Srxlev > $S_{IntraSearchP}$ and Squal > $S_{IntraSearchQ}$, the UE may choose<br>        not to perform intra-frequency measurements.<br>    Otherwise, the UE shall perform intra-frequency measurements.<br>    The UE shall apply the following rules for NR inter-frequencies and inter-RAT<br>        frequencies which are indicated in system information and for which the UE has priority<br>        provided as defined in 5.2.4.1: |

TABLE 1-continued

Measurement rules

For a NR inter-frequency or inter-RAT frequency with a reselection priority higher than the reselection priority of the current NR frequency, the UE shall perform measurements of higher priority NR inter-frequency or inter-RAT frequencies according to TS 38.133.

For a NR inter-frequency with an equal or lower reselection priority than the reselection priority of the current NR frequency and for inter-RAT frequency with lower reselection priority than the reselection priority of the current NR frequency:
  If the serving cell fulfils Srxlev > $S_{nonIntraSearchP}$ and Squal > $S_{nonIntraSearchQ}$, the UE may choose not to perform measurements of NR inter-frequency cells of equal or lower priority, or inter-RAT frequency cells of lower priority;
  Otherwise, the UE shall perform measurements of NR inter-frequency cells of equal or lower priority, or inter-RAT frequency cells of lower priority according to TS 38.133.

If the UE supports relaxed measurement and relaxedMeasurement is present in SIB2, the UE may further relax the needed measurements, as specified in clause 5.2.4.9.

As shown above, the measurement rule in an TN is defined with Srxlev and/or Squal dependent conditions. For Srxlev and/or Squal. The following detail as shown in TABLE 2 is also specified in 3GPP standard specification TS 38.304.

TABLE 2

Measurement rules in an TN $Srxlev = Q_{rxlevmeas} - (Q_{rxlevmin} + Q_{rxlevminoffset}) - P_{compensation} - Qoffset_{temp}$
$Squal = Q_{qualmeas} - (Q_{qualmin} + Q_{qualminoffset}) - Qoffset_{temp}$ Parameters for measurement rules are defined as shown in TABLE 3.

TABLE 3

Parameters for the measurement rules

| | |
|---|---|
| Srxlev | Cell selection RX level value (dB) |
| Squal | Cell selection quality value (dB) |
| $Qoffset_{temp}$ | Offset temporarily applied to a cell as specified in TS 38.331 [3] (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, $Q_{rxlevmin}$ is obtained from q-RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else $Q_{rxlevmin}$ is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN, as specified in TS 23.122. |
| $Q_{qualminoffset}$ | Offset to the signalled $Q_{qualmin}$ taken into account in the Squal evaluation as a result of a periodic search for a higher priority PLMN while camped normally in a VPLMN, as specified in TS 23.122. |
| $P_{compensation}$ | For FR1, if the UE supports the additionalPmax in the NR-NS-PmaxList, if present, in SIB1, SIB2 and SIB4: $\max(P_{EMAX1} - P_{PowerClass}, 0) - (\min(P_{EMAX2}, P_{PowerClass}) - \min(P_{EMAX1}, P_{PowerClass}))$ (dB); else: $\max(P_{EMAX1} - P_{PowerClass}, 0)$ (dB) For FR2, $P_{compensation}$ is Set to 0. |

TABLE 3-continued

Parameters for the measurement rules

| | |
|---|---|
| $P_{EMAX1}$, $P_{EMAX2}$ | Maximum TX power level of a UE may use when transmitting on the uplink in the cell (dBm) defined as $P_{EMAX}$ in TS 38.101. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4 as specified in TS 38.331, else $P_{EMAX1}$ and $P_{EMAX2}$ are obtained from the p-Max and NR-NS-PmaxList respectively in SIB1, SIB2 and SIB4 for normal UL as specified in TS 38.331. |
| $P_{PowerClass}$ | Maximum RF output power of the UE (dBm) according to the UE power class as defined in TS 38.101-1. |

The signaled values Qrxlevminoffset and Qqualminoffset are only applied when a cell is evaluated for cell selection as a result of a periodic search for a higher priority PLMN while camped normally in a VPLMN (see 3GPP standard specification TS 23.122). During this periodic search for higher priority PLMN, the UE may check the S criteria of a cell using parameter values stored from a different cell of this higher priority PLMN.

Basically, if the serving cell's (Srxlev>threshold #1) AND (Squal>threshold #2), the UE skips intra-frequency and/or inter-frequency neighboring cells measurements.

If the location assisted cell reselection is used for the UE who has valid UE location information, the distance between the UE and the serving cell's reference point may be also considered in the measurement rule.

Figure 6:
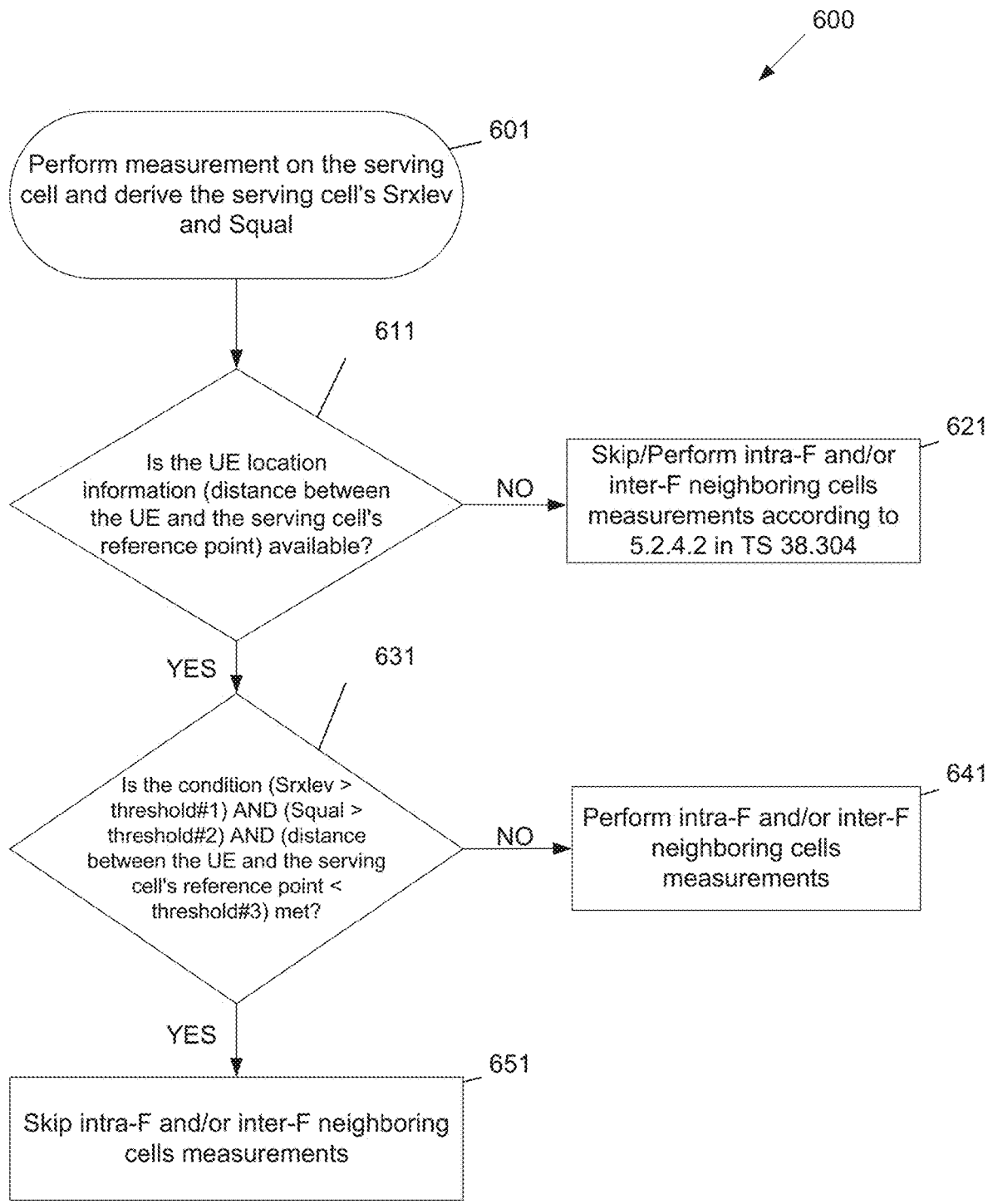
FIG. 6 illustrate a flow chart of measurement rule in an NTN according to embodiments of the present disclosure.

FIG. 6 illustrate a flow chart of measurement rule 600 in an NTN according to embodiments of the present disclosure. The measurement rule 600 as may be performed by a UE (e.g., 111-116 as illustrated in FIG. 1). An embodiment of the measurement rule 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

FIG. 6 illustrates one example of measurement rule in an NTN. As shown in FIG. 6, in step 601, a UE in RRC idle/inactive state performs measurement on the serving cell and derives the serving cell's Srxlev and Squal. In step 611, the UE checks if valid UE location information is available (or if location assisted cell reselection is used since the UE has valid UE location information). If the UE does not have the valid UE location information (or if location assisted cell reselection is not used since the UE does not have valid UE location information), in step 621, the UE skips or performs intra-frequency and/or inter-frequency neighboring cells measurements according to 3GPP standard specification TS 38.304.

If the UE has the valid UE location information (or if location assisted cell reselection is used since the UE has valid UE location information), in step 631, the UE checks if the following condition is met. Note threshold #1, threshold #2, threshold #3, and the serving cell's reference point are configured by system information by the serving gNB. Note threshold #3 is distance threshold.

The following condition is provided as given by: Condition: (Srxlev>threshold #1) AND (Squal>threshold #2) AND (distance between the UE and the serving cell's reference point<threshold #3).

If the above condition is met, in step 651, the UE skips intra-frequency and/or inter-frequency neighboring cells measurements. If the above condition is not met, in step 641, the UE performs intra-frequency and/or inter-frequency neighboring cells measurements.

Figure 7:
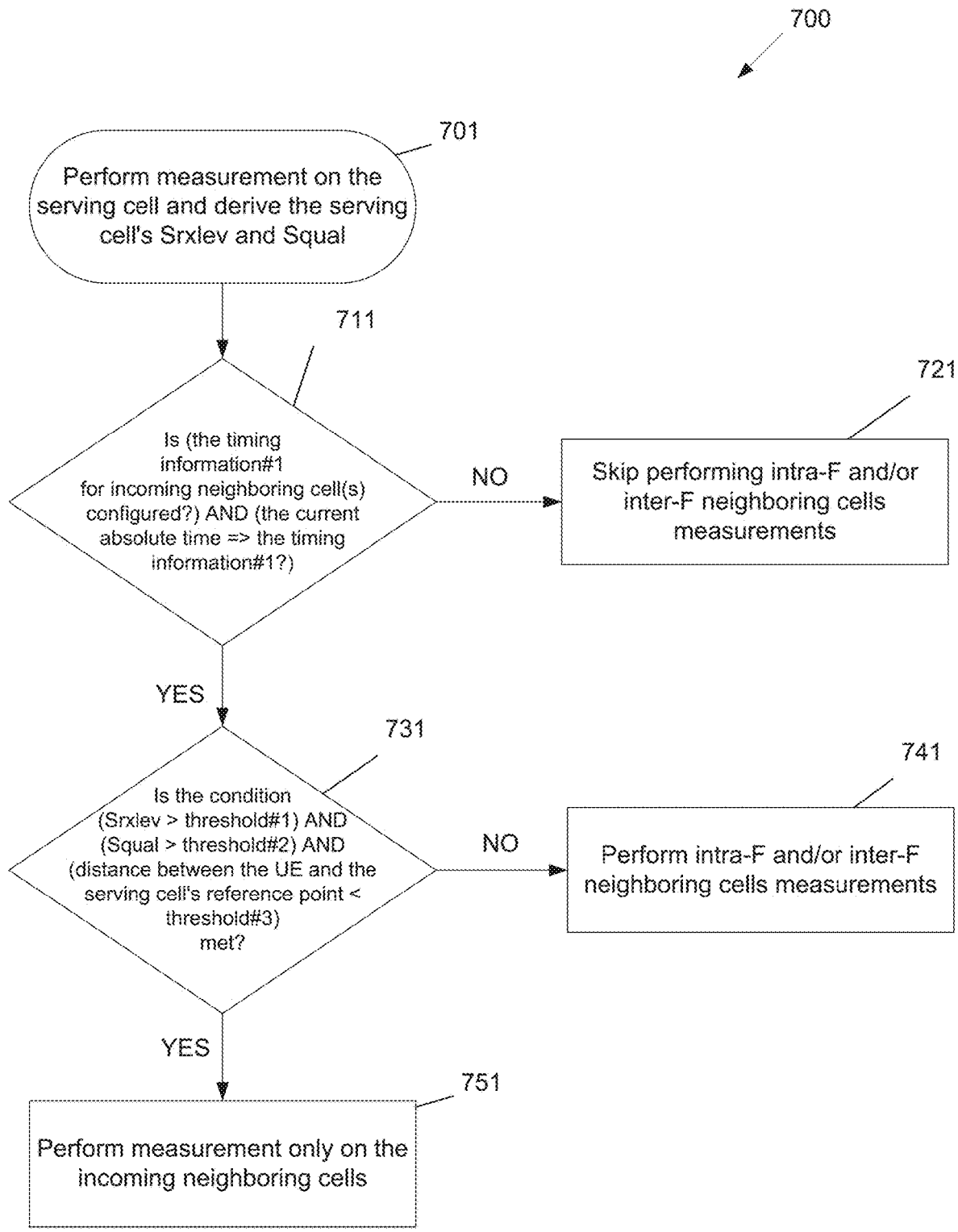
FIG. 7 illustrate another flow chart of measurement rule in an NTN according to embodiments of the present disclosure.

FIG. 7 illustrate another flow chart of measurement rule 700 in an NTN according to embodiments of the present disclosure. The measurement rule 700 as may be performed by a UE (e.g., 111-116 as illustrated in FIG. 1). An embodiment of the measurement rule 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

FIG. 7 illustrates another example of measurement rule in an NTN. In this example, it is assumed that a gNB may configure the timing information #1 for incoming neighboring cell(s) via system information, e.g., the absolute timing information and incoming cell(s) information (including physical cell id, cell's SSB configuration, cell's located frequency information, etc.).

In the NTN, the network can know when the serving cell stops serving a geo-location where the UE is located, and which and when the neighboring cell is incoming to serve that geo-location according to satellite movements. In step 701, the UE in an RRC idle/inactive state performs measurement on the serving cell and derives the serving cell's Srxlev and Squal. In step 711, the UE checks if (the timing information #1 for incoming neighboring cell(s) (or for the current serving cell to stop serving the geo-location) is configured) AND (the current absolute time=>the timing information #1). If the condition is not met (e.g., if the timing information #1 is not configured, or {(if the timing information #1 is configured) AND (the current absolute time<the timing information #1)}), in step 721, the UE skips performing intra-frequency and/or inter-frequency neighboring cells measurements.

If the condition is met (it means the timing information #1 for incoming neighboring cell(s) (or for the current serving cell to stop serving the geo-location) is configured and the current absolute time=>the timing information #1), in step 731, the UE checks if the following condition is met. Note threshold #1, threshold #2, threshold #3, and the serving cell's reference point are configured by system information by the serving gNB. Note that threshold #3 is a distance threshold. The condition is provided as given by: Condition: (Srxlev>threshold #1) AND (Squal>threshold #2) AND (distance between the UE and the serving cell's reference point<threshold #3).

If the condition is met, in step 751, the UE performs measurement only on the configured incoming neighboring cells (or the configured neighboring cells that are linked to the timing information #1). Note that the UE can skip other intra-frequency and/or inter-frequency neighboring cells measurements. If the condition is not met, in step 741, the UE performs intra-frequency and/or inter-frequency neighboring cells measurements.

In another, if the timing information #1 indicates the ending time when the serving cell stops serving a geo-location area, (the current absolute=>(the timing information #1−time margin for measurements)) can be used. Note that a time margin for measurement can be configured through system information by the gNB or the time margin can be determined by the UE implementation. Note that steps 701 and 731 can be omitted. In the case, based on the determination in step 711, the UE skips performing measurements on the neighboring cells and/or the serving cell in step 721 if 711 condition is not met and the UE performs measurements on the neighboring cells and/or the serving cell in step 741 if 711 condition is met. If 711 condition is met and the incoming neighboring cell(s) is/are configured, the UE can perform measurements on only the incoming neighboring cell(s) and/or the serving cell.

Figure 8:
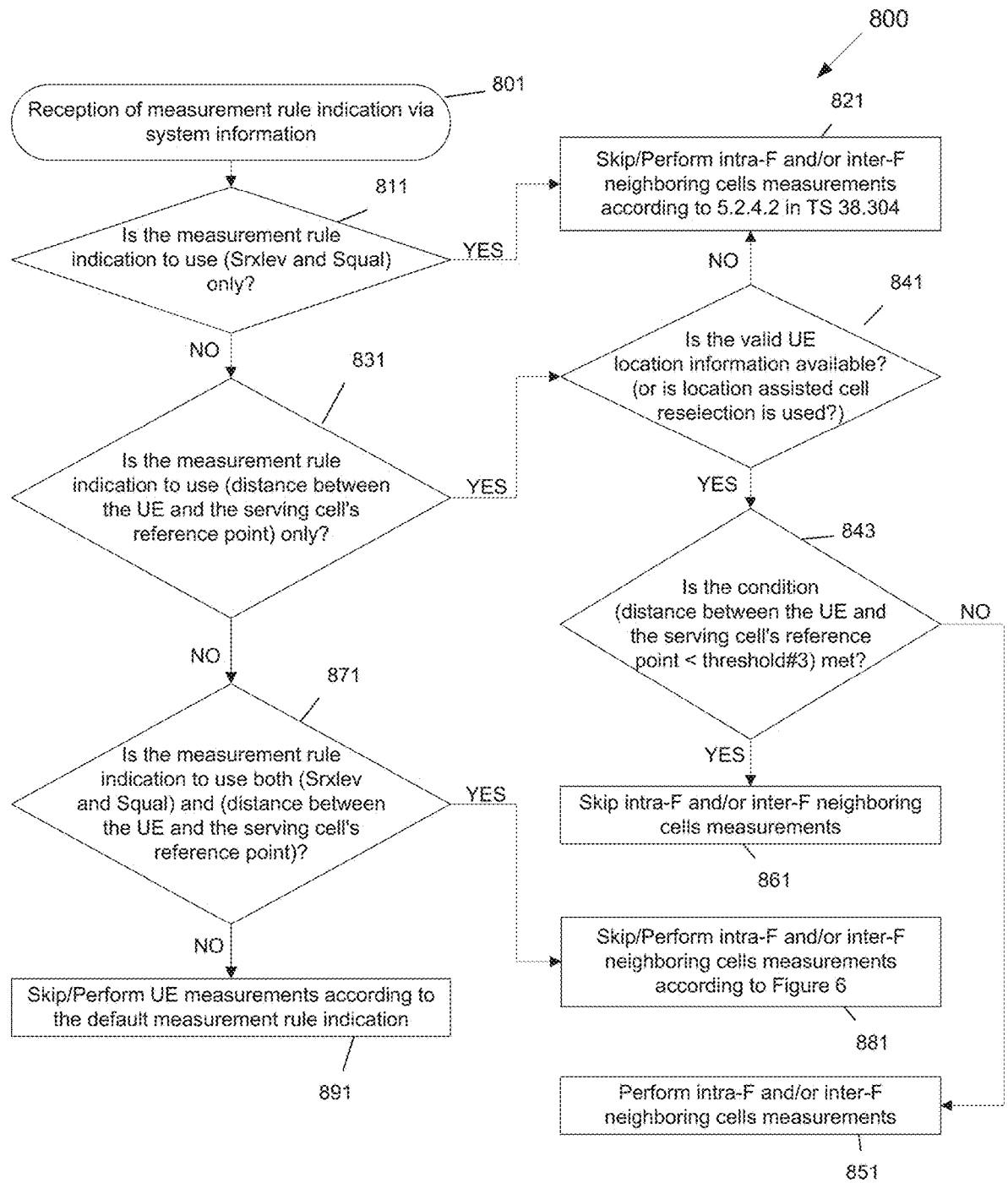
FIG. 8 illustrate yet another flow chart of measurement rule in an NTN according to embodiments of the present disclosure.

FIG. 8 illustrate yet another flow chart of measurement rule 800 in an NTN according to embodiments of the present disclosure. The measurement rule 800 as may be performed by a UE (e.g., 111-116 as illustrated in FIG. 1). An embodiment of the measurement rule 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

FIG. 8 illustrates another example of measurement rule in an NTN. In this example, it is assumed that a gNB may configure the indication informing the UE whether (Srxlev and Squal) are used for the measurement rule or distance between the UE and the serving cell's reference point is used for the measurement rule or (Srxlev, Squal and distance between the UE and the serving cell's reference point) are used for the measurement rule.

In step 801, the UE in an RRC idle/inactive state receives a measurement rule indication configured via system information from the serving cell. In step 811, the UE checks if the measurement rule indication indicates to use (Srxlev and Squal) only. If yes in step 811, in step 821, the UE skips/performs intra-frequency and/or inter-frequency neighboring cells measurements according to 3GPP standard specification TS 38.304. If no in step 811, in step 831 the UE checks if the measurement rule indication indicates to use (distance between the UE and the serving cell's reference point) only. If yes in step 831, in step 841 the UE checks if the valid UE location information is available (or if the location assisted cell reselection is used). If no in step 841, in step 821 the UE skips/performs intra-frequency and/or inter-frequency neighboring cells measurements according to 3GPP standard specification TS 38.304. If yes in step 841, in step 843, the UE checks if the condition (distance between the UE and the serving cell's reference point<threshold #3) is met.

If the condition in step 843 is met, in step 861, the UE skips intra-frequency and/or inter-frequency neighboring cells measurements. If the condition in step 843 is not met, in step 851, the UE performs intra-frequency and/or inter-frequency neighboring cells measurements. If no in step 831, in step 871, the UE checks if the measurement rule indication indicates to use both (Srxlev and Squal) and (distance between the UE and the serving cell's reference point). If yes in step 871, in step 881, the UE skips or performs intra-frequency and/or inter-frequency neighboring cells measurements according to FIG. 6. If no in step 871, in step 891, the UE skips or performs intra-frequency and/or inter-frequency neighboring cells measurements to the default measurement rule indication.

In one embodiment, an intra-frequency cell reselection and inter-frequency (with the same cell reselection priority as the serving cell) cell reselection is provided.

In an NR TN, the following intra-frequency cell reselection and inter-frequency (with the same cell reselection priority as the serving cell) cell reselection are specified in 3GPP standard specification TS 38.304 as shown in TABLE 4.

TABLE 4

Intra-frequency cell reselection and inter-frequency cell reselection 5.2.4.6 Intra-frequency and equal priority inter-frequency Cell Reselection criteria
The cell-ranking criterion $R_s$ for serving cell and $R_n$ for neighbouring cells is defined by:
$R_s = Q_{meas, s} + Q_{hyst} - Qoffset_{temp}$
$R_n = Q_{meas, n} - Qoffset - Qoffset_{temp}$ Parameters for the intra-frequency cell reselection and inter-frequency cell reselection is provided in TABLE 5.

TABLE 5

Parameters for the intra-frequency cell reselection and inter-frequency cell reselection

| | |
|---|---|
| $Q_{meas}$ | RSRP measurement quantity used in cell reselections. |
| Qoffset | For intra-frequency: Equals to $Qoffset_{s,n}$, if $Qoffset_{s,n}$ is valid, otherwise this equals to zero. |
| | For inter-frequency: Equals to $Qoffset_{s,n}$ plus $Qoffset_{frequency}$, if $Qoffset_{s,n}$ is valid, otherwise this equals to $Qoffset_{frequency}$. |
| $Qoffset_{temp}$ | Offset temporarily applied to a cell as specified in TS 38.331. |

The UE may perform ranking of all cells that fulfil the cell selection criterion S, which is defined in 3GPP standard specification.

The cells may be ranked according to the R criteria specified above by deriving $Q_{meas,n}$ and $Q_{meas,s}$ and calculating the R values using averaged RSRP results.

If rangeToBestCell is not configured, the UE may perform a cell reselection to the highest ranked cell. If this cell is found to be not-suitable, the UE may behave according to 3GPP standard specification.

If rangeToBestCell is configured, then the UE may perform the cell reselection to the cell with the highest number of beams above the threshold (i.e. absThreshSS-BlocksConsolidation) among the cells whose R value is within rangeToBestCell of the R value of the highest ranked cell. If there are multiple such cells, the UE may perform the cell reselection to the highest ranked cell among them. If this cell is found to be not-suitable, the UE may behave according to 3GPP standard specification.

In all cases, the UE may reselect the new cell, only if the following conditions are met: (1) Condition 1: the new cell is better than the serving cell according to the cell reselection criteria specified above during a time interval $Treeselection_{RAT}$; and (2) Condition 2: more than 1 second has elapsed since the UE camped on the current serving cell. If rangeToBestCell is configured but absThreshSS-Blocks Consolidation is not configured on an NR frequency, the UE considers that there is one beam above the threshold for each cell on that frequency.

If the location assisted cell reselection is used for the UE who has valid UE location information, the distance between the UE and the serving and neighboring cells' reference points should be also considered in the cell ranking criterion.

Figure 9:
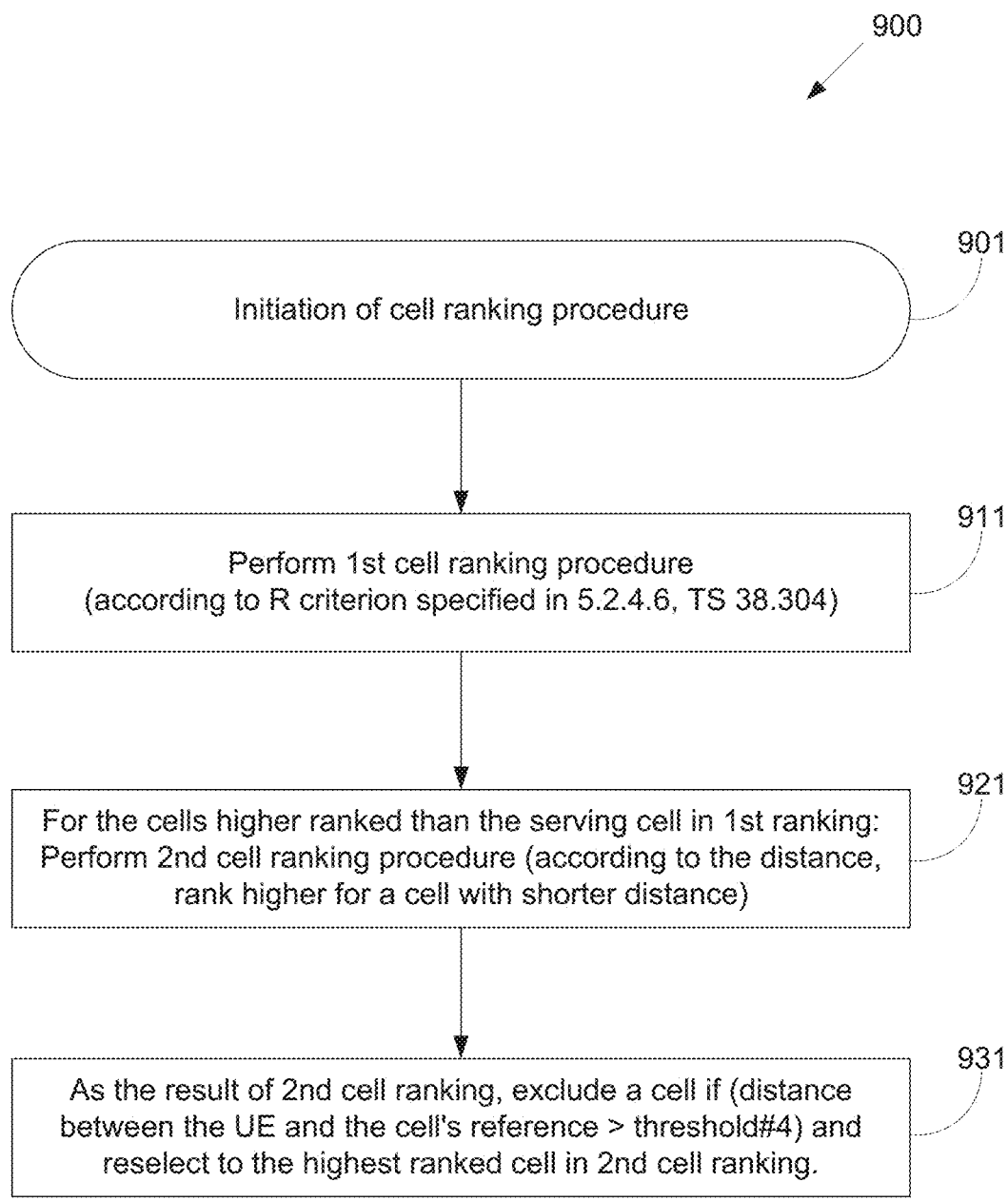
FIG. 9 illustrate a flow chart of method for an intra-frequency and equal priority inter-frequency cell reselection in an NTN according to embodiments of the present disclosure.

FIG. 9 illustrate a flow chart of method 900 for an intra-frequency and equal priority inter-frequency cell reselection in an NTN according to embodiments of the present disclosure. The method 900 as may be performed by a UE (e.g., 111-116 as illustrated in FIG. 1). An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

FIG. 9 illustrates one example of the cell ranking procedure for intra-frequency and equal priority inter-frequency cell reselection in an NTN. In step 901, the UE initiates cell ranking procedure. In step 911, the UE performs the 1st cell ranking procedure according to R criterion specified in 3GPP standard specification TS 38.304. In step 921, among the cells higher ranked than the serving cell in the 1st cell ranking procedure the UE performs 2nd cell ranking procedure according to the distance between the UE and each candidate cell's reference point. The UE ranks a cell higher if the distance between the UE and the cell's reference point is shorter than the one of other candidate cells (a cell with the shorter distance is ranked higher).

In step 931, as the result of 2nd cell ranking procedure, the UE excludes a cell from the candidate cells to be reselected if the distance between the UE and the cell's reference point>threshold #4. Note that the threshold #4 and each cell's (including the serving cell and neighboring cells) reference point can be configured via system information by the gNB. Among the remained candidate cells after the exclusion, the UE reselects the highest ranked cell in 2nd cell ranking. As alternative example, among the remained candidate cells after the exclusion, the UE reselects the highest ranked cell in 1st cell ranking.

Figure 10:
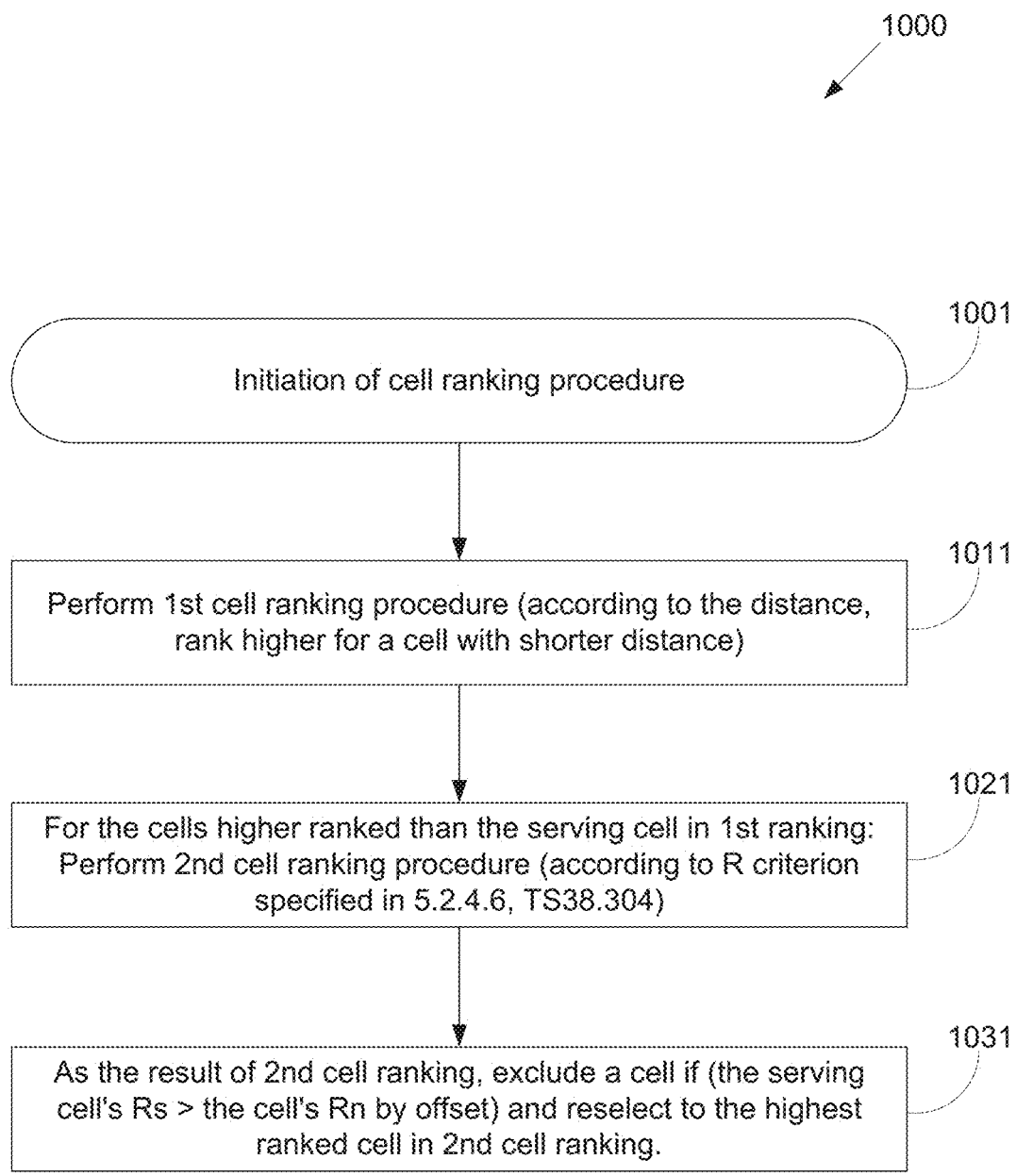
FIG. 10 illustrate another flow chart of method for an intra-frequency and equal priority inter-frequency cell reselection in an NTN according to embodiments of the present disclosure.

FIG. 10 illustrate another flow chart of method 1000 for an intra-frequency and equal priority inter-frequency cell reselection in an NTN according to embodiments of the present disclosure. The method 1000 as may be performed by a UE (e.g., 111-116 as illustrated in FIG. 1). An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

FIG. 10 illustrates another example of the cell ranking procedure for intra-frequency and equal priority inter-frequency cell reselection in an NTN. In step 1001, the UE initiates cell ranking procedure. In step 1011, the UE performs 1st cell ranking procedure according to the distance between the UE and the serving/neighboring cells' reference point. The UE ranks a cell higher if the distance between the UE and the cell's reference point is shorter than the one of other cells (a cell with the shorter distance is ranked higher). In step 1021, among the cells higher ranked than the serving cell in 1st ranking procedure the UE performs 2nd cell ranking procedure according to R criterion specified in 3GPP standard specification TS 38.304.

In step 1031, as the result of 2nd cell ranking the UE excludes a cell from the candidate cells to be reselected if (the serving cell's Rs>the cell's Rn by offset). Note that an offset can be also configured by system information. In step 1031, as alternative of the condition "if (the serving cell's Rs>the cell's Rn by offset)," the condition "if the cell's Rn<threshold #5" can be also used.

Note that threshold #5 can be also configured via system information. Among the remained candidate cells after the exclusion, the UE reselects the highest ranked cell in 2nd cell ranking. As alternative example, among the remained candidate cells after the exclusion, the UE reselects the highest ranked cell in 1st cell ranking.

As alternative means in FIG. 9 and FIG. 10, the restriction "For the cells higher ranked than the serving cell in 1st ranking": may be removed in step 921 and step 1021. As another example of intra-frequency and equal priority inter-frequency cell reselection in an NTN, the gNB may configure the indication the order of cell ranking procedure (whether 1st ranking is based on R criterion and 2nd ranking is based on the distance or in the other way around). Then the UE performs cell ranking procedures according to the indication (similar to either FIG. 9 or FIG. 10 according to the indication).

As another example of intra-frequency and equal priority inter-frequency cell reselection in NTN, the gNB may configure the indication to inform the UE which criterion is used for the cell reselection. For example, if the indication indicates R criterion only, the UE performs cell reselection according to 3GPP standard specification TS 38.304. If the indication indicates distance criterion only, the UE performs cell reselection only based on the distance (the UE performs cell reselection to the cell with the shortest distance than the one of other cells). If the indication indicates both R criterion and distance criteria, the UE performs cell reselection based two-steps ranking procedure (as shown in FIG. 9, FIG. 10, or other examples described herein).

In one embodiment, an inter-frequency (with the different cell reselection priority as the serving cell) and inter-RAT cell reselection may be provided.

In an NR TN, the following inter-frequency (with the different cell reselection priority as the serving cell) and inter-RAT cell reselection are specified in 3GPP standard specification TS 38.304 as shown in TABLE 6.

TABLE 6

NR Inter-frequency and inter-RAT Cell Reselection criteria 5.2.4.5 NR Inter-frequency and inter-RAT Cell Reselection criteria
If threshServingLowQ is broadcast in system information and more than 1 second has elapsed since the UE camped on the current serving cell, cell reselection to a cell on a higher priority NR frequency or inter-RAT frequency than the serving frequency shall be performed if:
   A cell of a higher priority NR or EUTRAN RAT/frequency fulfils Squal > $Thresh_{X,HighQ}$
      during a time interval $Treselection_{RAT}$
Otherwise, cell reselection to a cell on a higher priority NR frequency or inter-RAT frequency than the serving frequency shall be performed if:
   A cell of a higher priority RAT/frequency fulfils Srxlev > $Thresh_{X,HighP}$ during a time
      interval $Treselection_{RAT}$; and
   More than 1 second has elapsed since the UE camped on the current serving cell.
Cell reselection to a cell on an equal priority NR frequency shall be based on ranking for intra-frequency cell reselection as defined in clause 5.2.4.6.
If threshServingLowQ is broadcast in system information and more than 1 second has elapsed since the UE camped on the current serving cell, cell reselection to a cell on a lower priority NR frequency or inter-RAT frequency than the serving frequency shall be performed if:
   The serving cell fulfils Squal < $Thresh_{Serving,LowQ}$ and a cell of a lower priority NR or E-
      UTRAN RAT/frequency fulfils Squal > $Thresh_{X,LowQ}$ during a time interval
      $Treselection_{RAT}$.
Otherwise, cell reselection to a cell on a lower priority NR frequency or inter-RAT frequency than the serving frequency shall be performed if:
   The serving cell fulfils Srxlev < $Thresh_{Serving,lowP}$ and a cell of a lower priority RAT/
      frequency fulfils Srxlev > $Thresh_{X,LowP}$ during a time interval $Treselection_{RAT}$; and
   More than 1 second has elapsed since the UE camped on the current serving cell.
Cell reselection to a higher priority RAT/frequency shall take precedence over a lower priority RAT/frequency if multiple cells of different priorities fulfil the cell reselection criteria.
If more than one cell meets the above criteria, the UE shall reselect a cell as follows:
   If the highest-priority frequency is an NR frequency, the highest ranked cell among the
      cells on the highest priority frequency(ies) meeting the criteria according to clause 5.2.4.6;
   If the highest-priority frequency is from another RAT, the strongest cell among the cells
      on the highest priority frequency(ies) meeting the criteria of that RAT.

Figure 11:
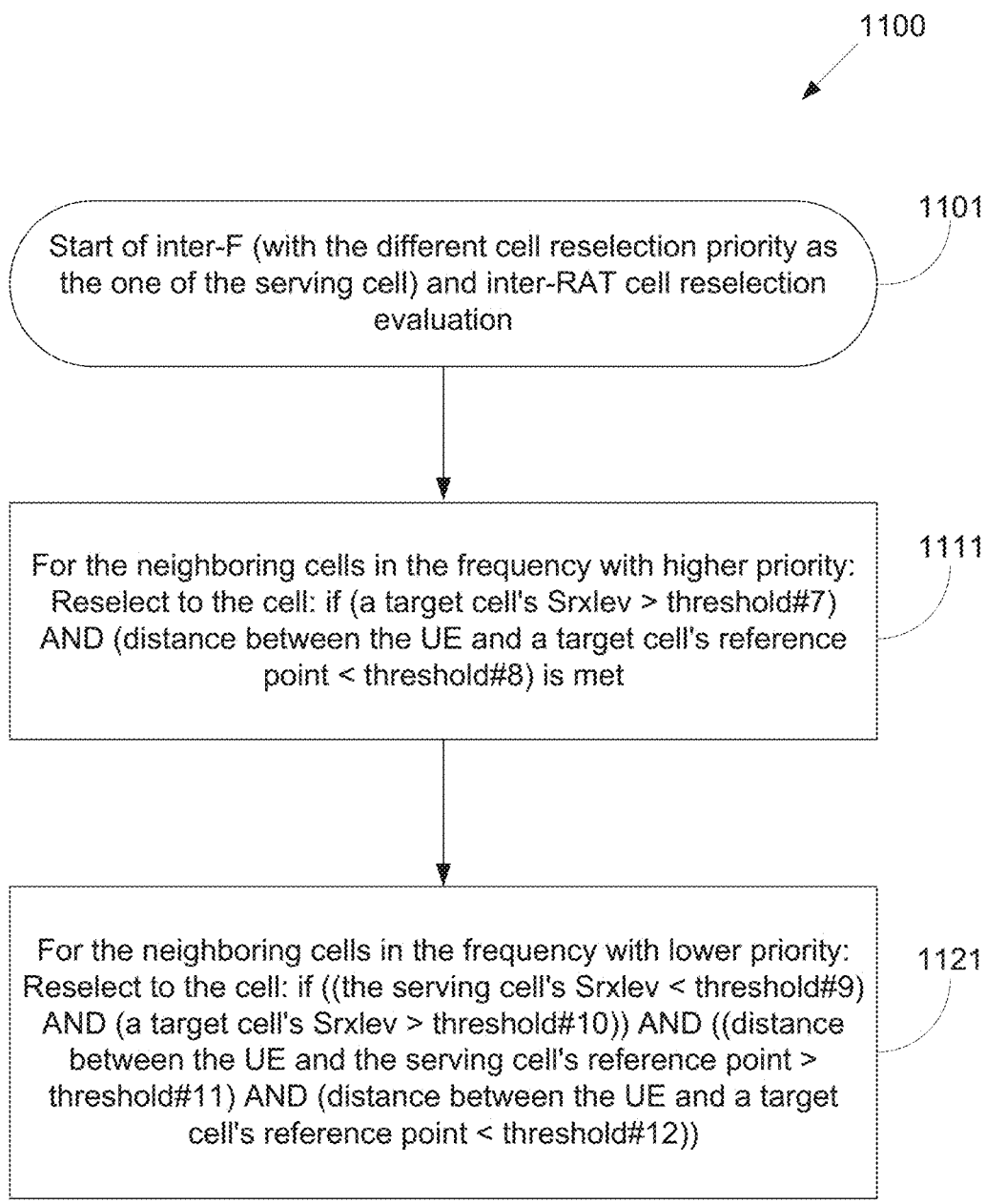
FIG. 11 illustrate a flow chart of method for a different priority inter-frequency or inter-RAT cell reselection in an NTN according to embodiments of the present disclosure.

FIG. 11 illustrate a flow chart of method 1100 for a different priority inter-frequency or inter-RAT cell reselection in an NTN according to embodiments of the present disclosure. The method 1100 as may be performed by a UE (e.g., 111-116 as illustrated in FIG. 1). An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

If the location assisted cell reselection is used for the UE who has valid UE location information, the distance between the UE and the serving and neighboring cells' reference points should be also considered in inter-frequency (with the different cell reselection priority as the serving cell) and inter-RAT cell reselection.

FIG. 11 illustrates one example of inter-frequency (with the different cell reselection priority as the serving cell) and inter-RAT cell reselection in NTN. In step 1101, the UE starts the evaluation for inter-frequency (with the different cell reselection priority as the one of the serving cells) and/or inter-RAT cell reselection. In step 1111, for a neighboring cell in the frequency (with the higher priority than the one of the serving cells) the UE performs cell reselection to the cell if the following condition is met.

Note that threshold #7, threshold #8, and each cell's (including the serving cell and neighboring cells) reference point can be configured by system information. Note that, as alternative, instead of "Srxlev," Squal can be used (dependent on network configuration). Note that, as alternative, instead of "AND," "OR" condition can be also used. The following condition is provided as given by: Condition: (a target cell's Srxlev>threshold #7) AND (distance between the UE and a target cell's reference point<threshold #8).

In step 1121, for a neighboring cell in the frequency (with the lower priority than the one of the serving cells), the UE performs cell reselection to the cell if the following condition is met. Note that threshold #9, threshold #10, threshold #11, threshold #12, and each cell's (including the serving cell and neighboring cells) reference point can be configured by system information. Note that, as alternative, instead of "Srxlev," Squal can be used (dependent on network configuration). Note that. as alternative, instead of "AND" between the conditions in [ ], "OR" condition can be also used. The following condition is provided as given by: Condition: [(the serving cell's Srxlev<threshold #9) AND (a target cell's Srxlev>threshold #10)] AND [(distance between the UE and the serving cell's reference point>threshold #11) AND (distance between the UE and a target cell's reference point<threshold #12)].

As another example of inter-frequency (with the different cell reselection priority as the serving cell) and inter-RAT cell reselection in an NTN, a gNB can configure an indication indicating what criterion is used in inter-frequency (with the different cell reselection priority as the serving cell) and inter-RAT cell reselection. If the indication indicates Srxlev or Squal criterion, the UE performs cell reselection according to 3GPP standard specification TS 38.304. If the indication indicates location criterion, the UE performs cell reselection according to the following conditions: (1) Condition 1: inter-frequency/RAT cell reselection to the higher priority if the condition (distance between the UE and a target cell's reference point<threshold #13) is met; and (2) Condition 2: inter-frequency/RAT cell reselection to the lower priority if the condition (distance between the UE and the serving cell's reference point>threshold #14) AND (distance between the UE and a target cell's reference point<threshold #15) is met.

If the indication indicates both (one of Srxlev or Squal) and location criteria, the UE performs cell reselection according to FIG. 11.

Figure 12:
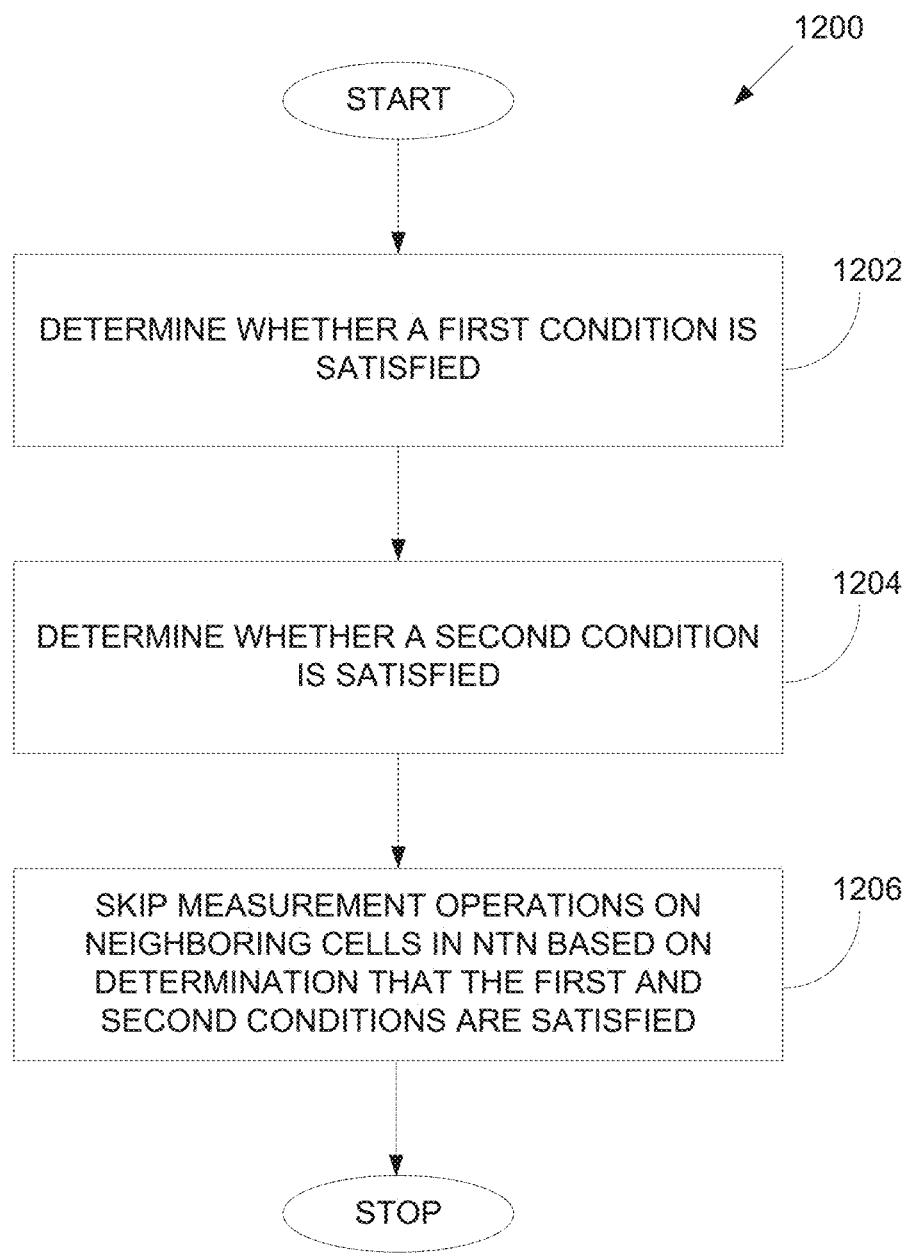
FIG. 12 illustrate a flow chart of method for measurement and cell reselection in an NTN according to embodiments of the present disclosure.

FIG. 12 illustrate a flow chart of method 1200 for measurement and cell reselection in an NTN according to embodiments of the present disclosure. The method 1200 as may be performed by a UE (e.g., 111-116 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, the method 1200 begins at step 1202. In step 1202, the UE determines, based on a first threshold and a second threshold, whether a first condition is satisfied.

In step 1204, the UE determines, based on a third threshold, whether a second condition is satisfied.

In step 1206, the UE skips measurement operations on neighboring cells in a non-terrestrial network (NTN) based on a determination that the first condition and the second condition are satisfied.

In step 1206, the first condition corresponds to a cell selection receive (RX) level value (Srxlev) being greater than the first threshold and a cell selection quality value (Squal) being greater than the second threshold, respectively, and the second condition corresponds to a distance between a UE location and a serving cell reference point being less than the third threshold.

In one embodiment, the UE receives, from a base station, information indicating the first threshold, the second threshold, and the third threshold via a system information block (SIB).

In one embodiment, the UE receives information indicating the serving cell reference point via an SIB.

In one embodiment, the UE skips the measurement operations when the third threshold is configured and the UE has a valid location information.

In one embodiment, the UE receives information indicating a fourth threshold time value via at least one of a SIB or a UE dedicated RRC message.

In one embodiment, the UE identifies a current absolute time, determines whether the current absolute time is before the fourth threshold time value, and skips the measurement operations on the neighboring cells in the NTN based on a determination that the current absolute time is before the fourth threshold time value.

In one embodiment, the UE receives information indicating a fourth threshold via a SIB; determines a first cell-ranking criterion based on RSRP measurement quantity and a second cell-ranking criterion based on a distance measurement quantity, wherein the distance measurement quantity corresponds to a distance between the UE and a corresponding cell reference point; applies the second cell-ranking criterion to neighboring cells that are higher ranked than a serving cell in the first cell-ranking criterion; and reselects, based on the second cell-ranking criterion, a cell when the distance is less than a fourth threshold.

In such embodiment, the first cell-ranking criterion is determined as: $R_s=Q_{meas,s}+Q_{hyst}-Qoffset_{temp}$ for a serving cell and $R_n=Q_{meas,n}-Qoffset-Qoffset_{temp}$ for neighbouring cells, where $Q_{meas}$ is RSRP measurement quantity used in a cell reselection operation, $Qh_{hyst}$ is a hysteresis value in decibel (dB), $Qoffset_{temp}$ is an offset value applied to the serving cell, and Qoffset is an offset value for a neighboring cell.

In such embodiment, the Srxlev and Squal are determined as given by: $Srxlev=Q_{rxlevmeas}-(Q_{rxlevmin}+Q_{rxlevminoffset})-P_{compensation}-QOffset_{temp}$; and $Squal=Q_{qualmeas}-(Q_{qualmin}+Q_{qualminoffset})-Qoffset_{temp}$, where $Qoffset_{temp}$ is an offset applied to the serving cell, $Q_{rxlevmeas}$ is a measured cell RX level value (RSRP), $Q_{qualmeas}$ is a measured cell quality value (RSRQ), $Q_{rxlevmin}$ is a minimum required RX level in a cell (dBm), $Q_{qualmin}$ is a minimum required quality level in a cell (dB), $Q_{rxlevminoffset}$ is an offset to signaled $Q_{rxlevmin}$ taken into account in Srxlev evaluation as a result of a periodic search for a higher priority public land mobile network (PLMN) while camped normally in a visited PLMN (VPLMN), $Q_{qualminoffset}$ is an offset to a signaled $Q_{qualmin}$ taken into account in Squal evaluation as a result of a periodic search for a higher priority PLMN while camped normally in a VPLMN, $P_{compensation}$ is determined, for FR1, if a UE supports additionalPmax in NR-NS-PmaxList, if present, in SIB1, SIB2 and SIB4: max(PEMAX1−PPowerClass, 0)−(min(PEMAX2, PPowerClass)— min(PEMAX1, PPowerClass)) (dB); else: max(PEMAX1−PPowerClass, 0) (dB) and, for FR2, $P_{compensation}$ is set to 0, and $P_{EMAX1}$ and $P_{EMAX2}$ are maximum TX power levels of a UE when transmitting on a uplink in the cell (dBm) defined as $P_{EMAX}$ in 3GPP standard specification.

In one embodiment, the UE receives a fourth threshold and a fifth threshold via a SIB.

In one embodiment, the UE determines whether a Srxlev of cell is greater than the fourth threshold and the distance between the UE location and a neighboring cell reference point is less than the fifth threshold, and reselects a cell based on a determination that the Srxlev is greater than the fourth threshold and the distance between the UE location and the neighboring cell reference point is less than the fifth threshold.

In one embodiment, the UE receives a fourth threshold, a fifth threshold, a sixth threshold, and a seventh threshold via a SIB.

In one embodiment, the UE determines whether a Srxlev of a serving cell is less than the fourth threshold, an Srxlev of a neighboring cell is greater than the fifth threshold, and the distance between the UE and the serving cell reference point is greater than the sixth threshold, and the distance between the UE and a neighboring cell reference point is less than the seventh threshold, and reselects a cell based on a determination that the Srxlev of the serving cell is less than the fourth threshold, the Srxlev of the neighboring cell is greater than the fifth threshold, the distance between the UE and the serving cell reference point is greater than the sixth threshold, and the distance between the UE and the neighboring cell reference point is less than the seventh threshold.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
a transceiver; and
a processor operably coupled to the transceiver, the processor configured to:
determine, based on a first threshold and a second threshold, whether a first condition is satisfied,
determine, based on a third threshold, whether a second condition is satisfied, and
skip measurement operations on neighboring cells in a non-terrestrial network (NTN) based on a determination that the first condition and the second condition are satisfied,
wherein:
the first condition corresponds to a cell selection receive (RX) level value (Srxlev) being greater than the first threshold and a cell selection quality value (Squal) being greater than the second threshold, respectively,
the second condition corresponds to a distance between a UE location and a serving cell reference point being less than the third threshold, and
the UE performs a location assisted cell reselection based on the third threshold to skip the measurement operations.

2. The UE of claim 1, wherein the transceiver is configured to receive, from a base station, information indicating the first threshold, the second threshold, and the third threshold via a system information block (SIB).

3. The UE of claim 1, wherein the transceiver is configured to receive information indicating the serving cell reference point via a system information block (SIB).

4. The UE of claim 1, wherein the processor is further configured to skip the measurement operations when the third threshold is configured and the UE has valid location information.

5. The UE of claim 1, wherein:
the transceiver is configured to receive information indicating a fourth threshold time value via at least one of a system information block (SIB) or a UE dedicated radio resource control (RRC) message; and
the processor is further configured to:
identify a current absolute time,
determine whether the current absolute time is before the fourth threshold time value, and
skip the measurement operations on the neighboring cells in the NTN based on a determination that the current absolute time is before the fourth threshold time value.

6. The UE of claim 1, wherein:
the transceiver is configured to receive information indicating a fourth threshold via a system information block (SIB); and
the processor is further configured to:
determine a first cell-ranking criterion based on reference signal received power (RSRP) measurement quantity and a second cell-ranking criterion based on a distance measurement quantity, wherein the distance measurement quantity corresponds to a distance between the UE and a corresponding cell reference point, apply the second cell-ranking criterion to neighboring cells that are higher ranked than a serving cell in the first cell-ranking criterion, and
reselect, based on the second cell-ranking criterion, a cell when the distance is less than a fourth threshold.

7. The UE of claim 6, wherein the first cell-ranking criterion is determined as: $R_s = Q_{meas,s} + Q_{hyst} - \text{Qoffset}_{temp}$ for a serving cell and $R_n = Q_{meas,n} - \text{Qoffset} - \text{Qoffset}_{temp}$ for neighbouring cells, where $Q_{meas}$ is RSRP measurement quantity used in a cell reselection operation, $Q_{hyst}$ is a hysteresis value in decibel (dB), $\text{Qoffset}_{temp}$ is an offset value applied to the serving cell, and Qoffset is an offset value for a neighboring cell.

8. The UE of claim 1, wherein the Srxlev and Squal are determined as given by:

$$\text{Srxlev} = Q_{rxlevmeas} - (Q_{xlevmin} + Q_{rxlevminoffset}) - P_{compensation} - \text{Qoffset}_{temp}; \text{ and}$$

$$\text{Squal} = Q_{qualmeas} - (Q_{qualmin} + Q_{qualminoffset}) - \text{Qoffset}_{temp},$$

where $\text{Qoffset}_{temp}$ is an offset applied to a serving cell, $Q_{rxlevmeas}$ is a measured cell RX level value (RSRP), $Q_{qualmeas}$ is a measured cell quality value (RSRQ), $Q_{rxlevmin}$ is a minimum required RX level in a cell (dBm), $Q_{qualmin}$ is a minimum required quality level in a cell (dB), $Q_{rxlevminoffset}$ is an offset to signaled $Q_{rxlevmin}$ taken into account in Srxlev evaluation as a result of a periodic search for a higher priority public land mobile network (PLMN) while camped normally in a visited PLMN (VPLMN), $Q_{qualminoffset}$ is an offset to a signaled $Q_{qualmin}$ taken into account in Squal evaluation as a result of a periodic search for a higher priority PLMN while camped normally in a VPLMN, $P_{compensation}$ is determined, for FR1, if a UE supports additionalPmax in NR-NS-PmaxList, if present, in SIB1, SIB2 and SIB4: max(PEMAX1−PPowerClass, 0)−(min(PEMAX2, PPowerClass)−min(PEMAX1, PPowerClass)) (dB); else: max(PEMAX1−PPowerClass, 0) (dB) and, for FR2, $P_{compensation}$ is set to 0, and PEMAX1 and PEMAX2 are maximum TX power levels of a UE when transmitting on a uplink in the cell (dBm) defined as $P_{EMAX}$ in 3GPP standard specification.

9. The UE of claim 1, wherein:
the transceiver is configured to receive a fourth threshold and a fifth threshold via a system information block (SIB); and
the processor is further configured to:
determine whether a Srxlev of cell is greater than the fourth threshold and the distance between the UE location and a neighboring cell reference point is less than the fifth threshold, and
reselect a cell based on a determination that the Srxlev is greater than the fourth threshold and the distance between the UE location and the neighboring cell reference point is less than the fifth threshold.

10. The UE of claim 1, wherein:
the transceiver is configured to receive a fourth threshold, a fifth threshold, a sixth threshold, and a seventh threshold via a system information block (SIB); and
the processor is further configured to:
determine whether a Srxlev of a serving cell is less than the fourth threshold, an Srxlev of a neighboring cell is greater than the fifth threshold, and the distance between the UE and the serving cell reference point is greater than the sixth threshold, and the distance between the UE and a neighboring cell reference point is less than the seventh threshold, and reselect a cell based on a determination that the Srxlev of the serving cell is less than the fourth threshold, the Srxlev of the neighboring cell is greater than the fifth threshold, the distance between the UE and the serving cell reference point is greater than the sixth threshold, and the distance between the UE and the neighboring cell reference point is less than the seventh threshold.

11. A method of user equipment (UE) in a wireless communication system, the method comprising:
determining, based on a first threshold and a second threshold, whether a first condition is satisfied;
determining, based on a third threshold, whether a second condition is satisfied; and
skipping measurement operations on neighboring cells in a non-terrestrial network (NTN) based on a determination that the first condition and the second condition are satisfied,
wherein:
the first condition corresponds to a cell selection receive (RX) level value (Srxlev) being greater than the first threshold and a cell selection quality value (Squal) being greater than the second threshold, respectively,
the second condition corresponds to a distance between a UE location and a serving cell reference point being less than the third threshold, and
the UE performs a location assisted cell reselection based on the third threshold to skip the measurement operations.

12. The method of claim 11, further comprising receiving, from a base station, information indicating the first threshold, the second threshold, and the third threshold via a system information block (SIB).

13. The method of claim 11, further comprising receiving information indicating the serving cell reference point via a system information block (SIB).

14. The method of claim 11, further comprising skipping the measurement operations when the third threshold is configured and the UE has valid location information.

15. The method of claim 11, further comprising:
receiving information indicating a fourth threshold time value via at least one of a system information block (SIB) or a UE dedicated radio resource control (RRC) message;
identifying a current absolute time;
determining whether the current absolute time is before the fourth threshold time value; and
skipping the measurement operations on the neighboring cells in the NTN based on a determination that the current absolute time is before the fourth threshold time value.

16. The method of claim 11, further comprising:
receiving information indicating a fourth threshold via a system information block (SIB);
determining a first cell-ranking criterion based on reference signal received power (RSRP) measurement quantity and a second cell-ranking criterion based on a distance measurement quantity, wherein the distance measurement quantity corresponds to a distance between the UE and a corresponding cell reference point;
applying the second cell-ranking criterion to neighboring cells that are higher ranked than a serving cell in the first cell-ranking criterion; and
reselecting, based on the second cell-ranking criterion, a cell when the distance is less than a fourth threshold.

17. The method of claim 16, wherein the first cell-ranking criterion is determined as: $R_s = Q_{meas,s} + Q_{hyst} - \text{Qoffset}_{temp}$ for a serving cell and $R_n = Q_{meas,n} - \text{Qoffset} - \text{Qoffset}_{temp}$ for neighbouring cells, where $Q_{meas}$ is RSRP measurement quantity used in a cell reselection operation, $Q_{hyst}$ is a hysteresis value in decibel (dB), $\text{Qoffset}_{temp}$ is an offset value applied to the serving cell, and Qoffset is an offset value for a neighboring cell.

18. The method of claim 11, wherein the Srxlev and the Squal are determined as given by:

$$\text{Srxlev} = Q_{rxlevmeas} - (Q_{rxlevmin} + Q_{rxlevminoffset}) - P_{compensation} - \text{Qoffset}_{temp}; \text{ and}$$

$$\text{Squal} = Q_{qualmeas} - (Q_{qualmin} + Q_{qualminoffset}) - \text{Qoffset}_{temp},$$

where $\text{Qoffset}_{temp}$ is an offset applied to a serving cell, $Q_{rxlevmeas}$ is a measured cell RX level value (RSRP), $Q_{qualmeas}$ is a measured cell quality value (RSRQ), $Q_{rxlevmin}$ is a minimum required RX level in a cell (dBm), $Q_{qualmin}$ is a minimum required quality level in a cell (dB), $Q_{rxlevminoffset}$ is an offset to signaled $Q_{rxlevmin}$ taken into account in Srxlev evaluation as a result of a periodic search for a higher priority public land mobile network (PLMN) while camped normally in a visited PLMN (VPLMN), $Q_{qualminoffset}$ is an offset to a signaled $Q_{qualmin}$ taken into account in Squal evaluation as a result of a periodic search for a higher priority PLMN while camped normally in a VPLMN, $P_{compensation}$ is determined, for FR1, if a UE supports additionalPmax in NR-NS-PmaxList, if present, in SIB1, SIB2 and SIB4: max($P_{EMAX}1$-PPowerClass, 0)−(min(PEMAX2, PPowerClass)−min($P_{EMAX}1$, PPowerClass)) (dB); else: max(PEMAX1−PPowerClass, 0) (dB) and, for FR2, $P_{compensation}$ is set to 0, and $P_{EMAX1}$ and $P_{EMAX2}$ are maximum TX power levels of a UE when transmitting on a uplink in the cell (dBm) defined as $P_{EMAX}$ in 3GPP standard specification.

19. The method of claim 11, further comprising:
receiving a fourth threshold and a fifth threshold via a system information block (SIB);
determining whether a Srxlev of cell is greater than the fourth threshold and the distance between the UE location and a neighboring cell reference point is less than the fifth threshold; and
reselecting a cell based on a determination that the Srxlev is greater than the fourth threshold and the distance between the UE location and the neighboring cell reference point is less than the fifth threshold.

20. The method of claim 11, further comprising:
receiving a fourth threshold, a fifth threshold, a sixth threshold, and a seventh threshold via a system information block (SIB);
determining whether a Srxlev of a serving cell is less than the fourth threshold, an Srxlev of a neighboring cell is greater than the fifth threshold, and the distance between the UE and the serving cell reference point is greater than the sixth threshold, and the distance between the UE and a neighboring cell reference point is less than the seventh threshold; and
reselecting a cell based on a determination that the Srxlev of the serving cell is less than the fourth threshold, the Srxlev of the neighboring cell is greater than the fifth threshold, the distance between the UE and the serving cell reference point is greater than the sixth threshold, and the distance between the UE and the neighboring cell reference point is less than the seventh threshold.

* * * * *